US011381387B2

(12) United States Patent
Nakarmi et al.

(10) Patent No.: US 11,381,387 B2
(45) Date of Patent: Jul. 5, 2022

(54) PROOF-OF-PRESENCE INDICATOR

(71) Applicant: Telefonaktiebolaget LM Ericsson (publ), Stockholm (SE)

(72) Inventors: Prajwol Kumar Nakarmi, Sollentuna (SE); Noamen Ben Henda, Stockholm (SE); Christine Jost, Lund (SE); Vesa Lehtovirta, Espoo (FI); Vesa Torvinen, Sauvo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 772 days.

(21) Appl. No.: 16/319,861

(22) PCT Filed: Jul. 25, 2017

(86) PCT No.: PCT/EP2017/068780
§ 371 (c)(1),
(2) Date: Jan. 23, 2019

(87) PCT Pub. No.: WO2018/019838
PCT Pub. Date: Feb. 1, 2018

(65) Prior Publication Data
US 2020/0186995 A1 Jun. 11, 2020

Related U.S. Application Data

(60) Provisional application No. 62/366,604, filed on Jul. 25, 2016.

(51) Int. Cl.
*H04W 12/06* (2021.01)
*H04L 9/08* (2006.01)
(Continued)

(52) U.S. Cl.
CPC .......... *H04L 9/0841* (2013.01); *H04L 9/3226* (2013.01); *H04L 9/3236* (2013.01);
(Continued)

(58) Field of Classification Search
CPC ..... H04L 9/006; H04L 9/0838; H04L 9/0869; H04L 9/12; H04L 9/32; H04L 9/3228;
(Continued)

(56) References Cited

U.S. PATENT DOCUMENTS

2003/0163737 A1* 8/2003 Roskind ................ H04L 9/3236
726/6
2004/0100936 A1* 5/2004 Liu ..................... H04W 74/085
370/345
(Continued)

FOREIGN PATENT DOCUMENTS

WO    WO 2015/166099 A1    11/2015

OTHER PUBLICATIONS

Communication pursuant to Article 94(3) EPC for European Patent Application No. 17751668.9 dated Mar. 18, 2021, 7 pages.
(Continued)

*Primary Examiner* — Eric W Shepperd
(74) *Attorney, Agent, or Firm* — Sage Patent Group

(57) ABSTRACT

Methods, network nodes, computer programs, carrier and user equipment, wherein a proof-of-presence in communications between private land mobile networks (PLMNs) is presented. In an example method performed by a network node in a home public land mobile network (HPLMN) of a user equipment (UE), the network node obtains, from a visited public land mobile network (VPLMN), a proof-of-presence indicator that represents the UE as being present in the VPLMN. The network node verifies whether or not the UE is present in the VPLMN by determining whether or not the proof-of-presence indicator was generated by the UE using a secret shared between the UE and at least the HPLMN. Upon verification of the presence of the UE in the VPLMN, sensitive information can be communicated by the HPLMN to the VPLMN.

15 Claims, 13 Drawing Sheets

(51) Int. Cl.
*H04L 9/32* (2006.01)
*H04W 12/03* (2021.01)
*H04W 12/033* (2021.01)
*H04W 12/0431* (2021.01)
*H04W 84/04* (2009.01)

(52) U.S. Cl.
CPC ......... *H04W 12/03* (2021.01); *H04W 12/033* (2021.01); *H04W 12/0431* (2021.01); *H04W 12/06* (2013.01); *H04L 2209/38* (2013.01); *H04L 2209/80* (2013.01); *H04W 84/042* (2013.01)

(58) Field of Classification Search
CPC ............. H04L 63/107; H04L 2209/80; H04W 12/033; H04W 84/042
See application file for complete search history.

(56) References Cited

U.S. PATENT DOCUMENTS

| | | | | |
|---|---|---|---|---|
| 2004/0205211 | A1* | 10/2004 | Takeda | H04L 61/2015 709/230 |
| 2006/0274899 | A1* | 12/2006 | Zhu | H04L 9/083 380/281 |
| 2007/0050635 | A1* | 3/2007 | Popp | H04L 9/3242 713/185 |
| 2007/0111705 | A1* | 5/2007 | Zhang | H04M 15/8038 455/405 |
| 2007/0255951 | A1 | 11/2007 | Grynberg | |
| 2009/0170507 | A1* | 7/2009 | Kim | H04W 60/02 455/433 |
| 2010/0146279 | A1* | 6/2010 | Lu | G06F 21/34 713/172 |
| 2010/0167755 | A1* | 7/2010 | Kim | H04W 48/18 455/456.1 |
| 2011/0289306 | A1* | 11/2011 | Khosravi | G06F 21/567 713/2 |
| 2013/0104238 | A1 | 4/2013 | Balsan et al. | |
| 2013/0281064 | A1* | 10/2013 | Hedberg | H04L 63/18 455/411 |
| 2015/0074782 | A1* | 3/2015 | Zhang | H04W 12/069 726/8 |
| 2015/0078245 | A1* | 3/2015 | Anchan | H04W 76/40 370/312 |
| 2016/0174077 | A1* | 6/2016 | Abramov | H04W 12/12 455/410 |
| 2017/0311151 | A1* | 10/2017 | Ohashi | H04L 65/1016 |

OTHER PUBLICATIONS

Ericsson et al., "New privacy solution on enhancing the concealment of permanent or long-term subscriber identifier," S3-160995, 3GPP TSG-SA WG3 Meetng #84, Chennai, India, Jul. 25-29, 2016, pp. 1-3.

International Search Report and Written Opinion of the International Searching Authority for International Application No. PCT/EP2017/068780 dated Sep. 26, 2017.

3GPP TR 33.899 v0.3.0, "3rd Generation Partnership Project; Technical Specification Group Services and System Aspects; Study on the security aspects of the next generation system (Release 14)," Jul. 2016, 77 pages.

\* cited by examiner

PROOF-OF-PRESENCE INDICATOR

CROSS REFERENCE TO RELATED APPLICATIONS

This application is a 35 U.S.C. § 371 national stage application of PCT International Application No. PCT/EP2017/068780, filed on Jul. 25, 2017, which claims the benefit of U.S. Provisional Patent Application Ser. No. 62/366,604, filed on Jul. 25, 2016, the disclosures and content of which are incorporated by reference herein in their entireties.

TECHNICAL FIELD

The application relates to methods, network nodes, user equipment (UE), computer program and carrier related to a proof-of-presence indicator that represents the UE as being present in a visited public land mobile network (VPLMN).

BACKGROUND

In existing wireless network systems (e.g., 2G, 3G, 4G systems), certain UE-specific operations require a VPLMN (VPLMN other than the home PLMN (HPLMN) of the UE) to have access to certain information corresponding to the UE in order to carry out necessary operations, such as subscriber identification and authorization.

As a result, certain UE information is typically considered sensitive and is therefore often only available to the UE and the HPLMN of the UE. The 3$^{rd}$ Generation Partnership Project discusses security enhancements with respect to the next generation of wireless telecommunication systems, as evidenced in 3GPP TR 33.899 V 0.3.0 "Study on the security aspects of the next generation system (Release 14)". One of the key problem issues of the TR-document is to make it harder to track the location or activity of a particular UE. However, because the sensitive information is sometimes needed by a VPLMN to perform required UE operations, it must be communicated to the VPLMN by the UE or the HPLMN. In cases where an unauthorized third party is able to access this information, however, it can be used to obtain private user information (e.g., user location). In some instances, these unauthorized third parties may gain control of a network node in an otherwise trusted VPLMN (or may imitate such a trusted VPLMN network node) and submit requests to the HPLMN for the sensitive user information in hopes of obtaining it via an HPLMN reply.

Therefore, improved techniques for communication of sensitive UE information are needed to ensure that required UE-specific functionality is maintained across public land mobile networks (PLMNs) without exposing sensitive user information to untrusted parties.

SUMMARY

An object of the invention is to enable improvement of the security in inter-PLMN communication.

One or more embodiments herein allow for secure communication of sensitive UE information from a home PLMN of the UE to a particular VPLMN using a proof-of-presence 101 of the UE in that VPLMN. To avoid sending this sensitive information to untrusted or compromised devices, the proof-of-presence 101 is generated (at the UE) and validated (at the HPLMN) according to a secret that is shared between the UE and the HPLMN, thereby minimizing the risk of user data breaches to devices that are not privy to the shared secret. If the HPLMN validates the proof-of-presence 101 using the secret, the sensitive information is sent to the requesting VPLMN and can be utilized by the VPLMN for performing required operations related to the UE.

A first aspect of the invention relates to a method performed by a network node in an HPLMN of a UE, which includes obtaining, from a VPLMN, a proof-of-presence indicator that represents the UE as being present in the VPLMN. In addition, the method includes the network node of the HPLMN verifying whether or not the UE is present in the VPLMN by determining whether or not the proof-of-presence indicator was generated by the UE using a secret shared between the UE and at least the HPLMN.

A second aspect of the invention relates to a method performed by a network node in a VPLMN, which method includes obtaining, from a UE, a proof-of-presence indicator that represents the UE as being present in the VPLMN. The method also includes sending the proof-of-presence indicator to an HPLMN corresponding to the UE for HPLMN verification as to whether or not the UE is present in the VPLMN. This verification includes a determination regarding whether or not the proof-of-presence indicator was generated by the UE using a secret shared between the UE and at least the HPLMN.

A third aspect relates to a method performed by a UE present in a VPLMN, the method including generating a proof-of-presence indicator that represents the UE as being present in the VPLMN by using a secret shared between the UE and at least a HPLMN of the UE. The UE-performed method also includes sending the proof-of-presence indicator to the VPLMN, the proof-of-presence indicator used by the HPLMN for verification as to whether the UE is present in the VPLMN, the verification including a determination regarding whether the proof-of-presence indicator was generated by the UE using the secret.

A fourth aspect relates to a network node in a HPLMN of a UE. The network node is configured to obtain, from a VPLMN, a proof-of-presence indicator that represents the UE as being present in the VPLMN; and verify whether or not the UE is present in the VPLMN by determining whether or not the proof-of-presence indicator was generated by the UE using a secret shared between the UE and at least the HPLMN.

A fifth aspect relates to a network node of a VPLMN. The network node is configured to obtain, from a UE, a proof-of-presence indicator that represents the UE as being present in the VPLMN; and send the proof-of-presence indicator to a HPLMN corresponding to the UE for HPLMN verification as to whether or not the UE is present in the VPLMN, the verification including a determination regarding whether or not the proof-of-presence indicator was generated by the UE using a secret shared between the UE and at least the HPLMN.

A sixth aspect relates to a UE present in a VPLMN (or adapted to/configured to be present in a VPLMN). The UE is configured to generate a proof-of-presence indicator that represents the UE as being present in the VPLMN by using a secret shared between the UE and at least a HPLMN of the UE; and send the proof-of-presence indicator to the VPLMN, the proof-of-presence indicator used by the HPLMN for verification as to whether or not the UE is present in the VPLMN, the verification including a determination regarding whether or not the proof-of-presence indicator was generated by the UE using the secret.

A seventh aspect relates to network node of a HPLMN of a UE. This network node comprises a processor and a memory, where the memory contains instructions executable by the processor whereby the network node is configured to: obtain, from a VPLMN, a proof-of-presence indicator that represents the UE as being present in the VPLMN; and verify whether or not the UE is present in the VPLMN by determining whether or not the proof-of-presence indicator was generated by the UE using a secret shared between the UE and at least the HPLMN.

An eighth aspect relates to a network node of a visited VPLMN. The network node comprises a processor and a memory, the memory containing instructions executable by the processor whereby the network node is configured to obtain, from a user equipment, UE, a proof-of-presence indicator that represents the UE as being present in the VPLMN; and send the proof-of-presence indicator to a HPLMN corresponding to the UE for HPLMN verification as to whether or not the UE is present in the VPLMN, the verification including a determination regarding whether or not the proof-of-presence indicator was generated by the UE using a secret shared between the UE and at least the HPLMN.

A ninth aspect relates to a UE present in a VPLMN (or adapted to/configured to be present in a VPLMN). The UE comprises a processor and a memory, the memory containing instructions executable by the processor whereby the network node is configured to: generate a proof-of-presence indicator that represents the UE as being present in the VPLMN by using a secret shared between the UE and at least a HPLMN of the UE; and send the proof-of-presence indicator to the VPLMN, the proof-of-presence indicator used by the HPLMN for verification as to whether or not the UE is present in the VPLMN, the verification including a determination regarding whether or not the proof-of-presence indicator was generated by the UE using the secret.

A tenth aspect relates to a network node of a HPLMN of a UE, the network node comprising: a first module to obtain, from a VPLMN, a proof-of-presence indicator that represents the UE as being present in the VPLMN; and a second module to verify whether or not the UE is present in the VPLMN by determining whether or not the proof-of-presence indicator was generated by the UE using a secret shared between the UE and at least the HPLMN.

An eleventh aspect relates to a network node of a VPLMN. The network node comprises: a first module to obtain, from a UE, a proof-of-presence indicator that represents the UE as being present in the VPLMN; and a second module to send the proof-of-presence indicator to a HPLMN corresponding to the UE for HPLMN verification as to whether or not the UE is present in the VPLMN, the verification including a determination regarding whether or not the proof-of-presence indicator was generated by the UE using a secret shared between the UE and at least the HPLMN.

A twelfth aspect relates to a UE present in a VPLMN (or adapted to/configured to be present in a VPLMN). The UE comprises: a first module to generate a proof-of-presence indicator that represents the UE as being present in the VPLMN by using a secret shared between the UE and at least a HPLMN of the UE; and a second module to send the proof-of-presence indicator to the VPLMN, the proof-of-presence indicator used by the HPLMN for verification as to whether or not the UE is present in the VPLMN, the verification including a determination regarding whether or not the proof-of-presence indicator was generated by the UE using the secret.

A thirteenth aspect relates to a computer program comprising instructions which, when executed by at least one processor of a network node, causes the network node to carry out any of the above-mentioned methods related to a network node.

A fourteenth aspect relates to a carrier containing the computer program, wherein the carrier is one of an electric signal, optical signal, radio signal, or computer readable storage medium.

DETAILED DESCRIPTION

Figure 1:
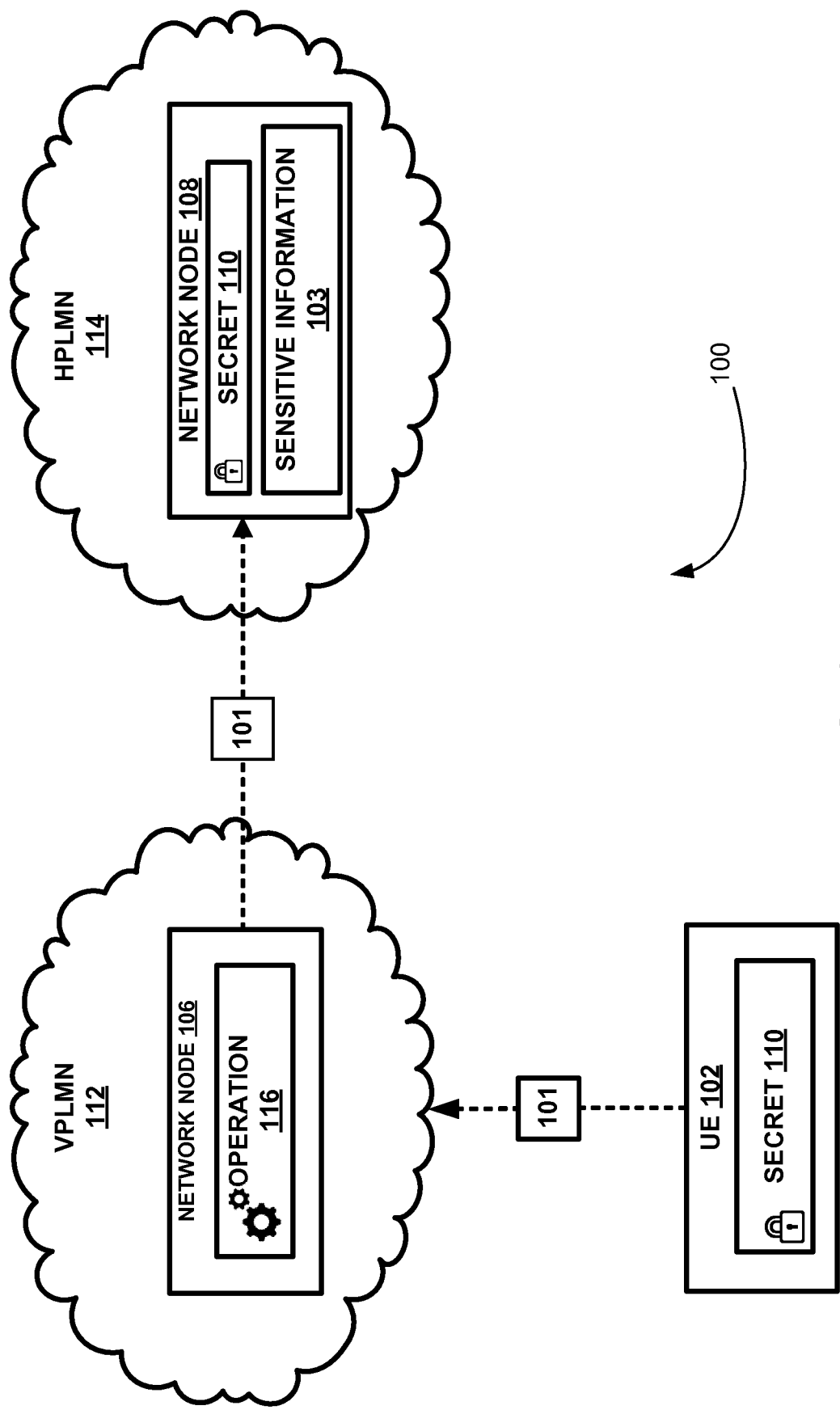
FIG. 1 illustrates a communication network corresponding to example embodiments of the invention.

FIG. 1 illustrates a communication system 100 that includes a home PLMN 114 for a UE 102 and a VPLMN 112 that provides network access and services to the UE 102 (i.e., is a current serving VPLMN or a serving PLMN of the UE). As shown in FIG. 1, the VPLMN 112 includes a network node 106 (among a plurality of network devices that are not explicitly shown), which is configured to perform at least an operation 116 related to the UE 102 (other UE-related operations performed may exist but are not shown). In some examples, sensitive information 103 of the UE 102 must be available to the network node 106 (or to the VPLMN 112, generally) in order for the operation 116 to be performed. By default, however, this sensitive information 103 may be kept privately at the home PLMN 114 and the UE 102 (and potentially other devices and/or networks to which the sensitive information 103 has been revealed previously). As such, in at least some examples, the VPLMN 112 must be granted access to the sensitive information 103 as a prerequisite to performing the operation 116. The UE may be for example a mobile phone, a laptop a tablet and an embedded device in e.g. white goods (such as refrigerator) or a vehicle (such as an infotainment system in the dashboard of a car or truck).

In a feature of the invention, before revealing this secret information 103, the HPLMN 114 receives a proof-of-presence indicator 101 that has been forwarded to the HPLMN 114 via a VPLMN 112. The proof-of-presence 101 indicator is generated by the UE 102 based on an aspect of a secret 110 shared between the UE 102 and the HPLMN 114, and, when verified based on the same secret at the HPLMN 114, serves as an indication that the UE 102 is truly being served by the VPLMN 112 (also referred to as "present" in VPLMN 112 for purposes of the present disclosure). When the HPLMN 114 is able to successfully verify the proof-of-presence 101 indicator, it can infer that the VPLMN 112 has not been compromised and that a request for sensitive information 103 received from VPLMN 112 therefore can be trusted. In other words, HPLMN verification of proof-of-presence indicator 101 using shared secret 110 helps ensure that a request for the sensitive information 103 did not originate from an untrusted or malicious source device.

Where the network node 108 validates the proof-of-presence 101 as being generated according to the secret 110, the network node 106 sends the sensitive information 103 to the network node 106. By revealing this sensitive information 103 to the VPLMN 112, the home PLMN 114 allows the network node 106 of the VPLMN 112 to perform the operation 116. Other features of the operation, structure, and features of the communication system 100 and the devices and networks therein shown in FIG. 1 will be introduced and explained below with reference to the remaining figures.

Before proceeding with further detailed description of the example embodiments, it should be noted that any disclosure that refers to a particular PLMN can be understood as also referring to the network node associated with the particular PLMN. Likewise, any disclosure that refers to a particular network node can be understood as also referring to the PLMN associated with the particular network node. For instance, any feature that is disclosed as corresponding to or being performed by home PLMN 114 should likewise be understood as optionally corresponding to or being performed by network node 108 of FIG. 1. Similarly, any feature that is disclosed as corresponding to or being performed by VPLMN 112 should likewise be understood as optionally corresponding to or being performed by network node 106 of FIG. 1. With that said, any two or more features or functionalities described as being performed by a PLMN should not be read as necessarily being associated with or performed by the exact same device in the PLMN. Instead, any two or more features that are disclosed as being performed by or associated with a particular PLMN, or disclosed as being performed by or associated with a network node of a particular PLMN should be read as optionally being associated with or performed by different example network nodes of the PLMN.

In an example of this directive, if the present disclosure states that "the VPLMN 112 stores a public value in its memory," it should also be understood to likewise disclose that "the network node 106 stores the public value in the memory of the network node 106 or in any other network node or device of the VPLMN 112 that contains memory upon which the public value may be stored." Furthermore, if the disclosure additionally states that "the VPLMN 112 compares a public value to private value," it should be understood to likewise disclose that "a comparison of the public value and the private value may be performed at the same network node 106 that stored the public value above, or at any other network node (other than the particular network node at which the public value was stored in memory) of the VPLMN that can be understood as performing such a comparison." In other words, the HPLMN 114 and VPLMN 112 should be understood as optionally comprising a plurality of network nodes, one or more of which can perform the disclosed functions or features attributed to the PLMN or to a network node thereof.

Figure 2:
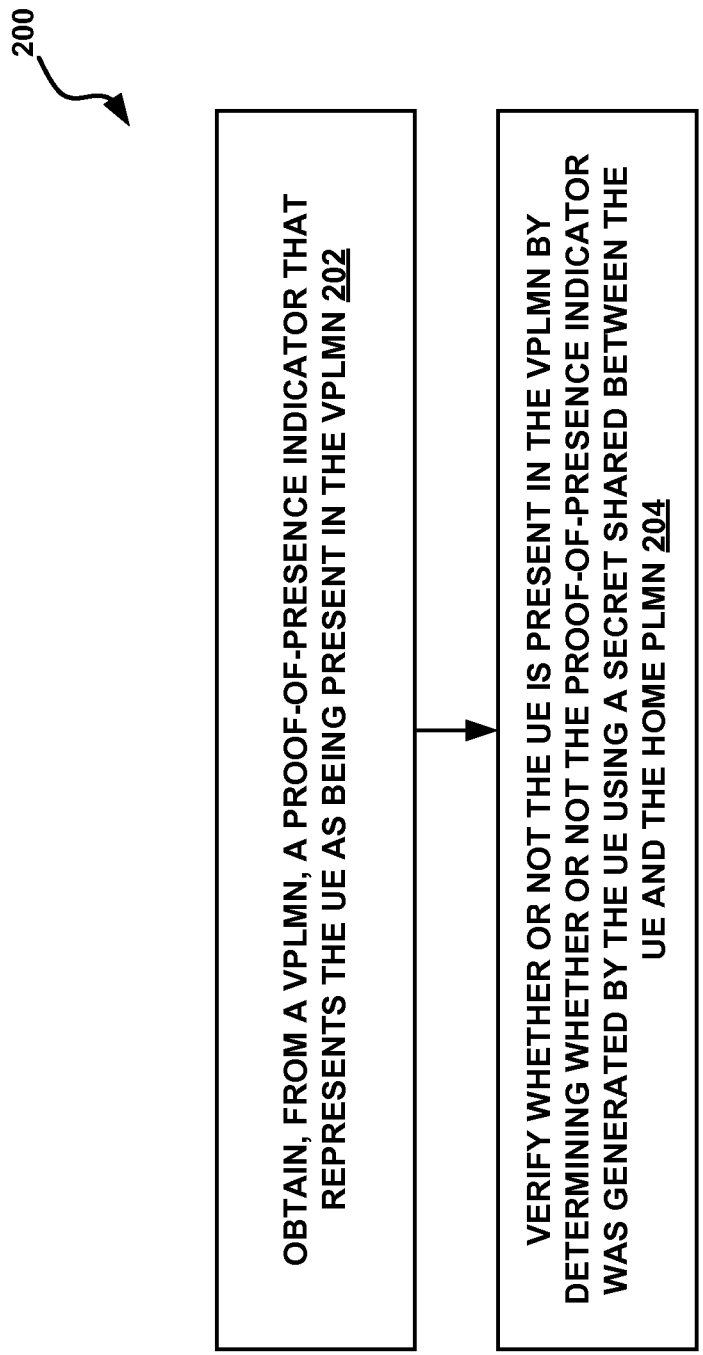
FIG. 2 illustrates a method performed by a network node of a VPLMN according to one or more embodiments.

FIG. 2 illustrates an example method 200 performed by a network node 108 of a HPLMN 114 for using a received proof-of-presence indicator 101 to verify a whether the UE 102 is present in a VPLMN 112 before revealing sensitive information 103 to the VPLMN 112. In some examples, the required sensitive information 103 may identify the UE device itself, although it may additionally or alternatively be associated with a particular user or subscriber account corresponding to the UE device For instance, the sensitive information 103 for a subscriber account associated with UE 102 may include particular authentication credentials, charging account or records, tokening and access policies, service parameters including QoS or subscriber level for one or more services, or the like, each of which may be established and/or maintained at the HLMN 114 of the UE 102. Accordingly, for purposes of the present disclosure, the term user equipment refers to not only a particular device, but also refers to a subscriber or user having an associated HPLMN.

Additionally, the sensitive information 103 may be a "long-term identifier," which, for purposes of the present application, corresponds to a static set of alphanumeric characters (or corresponding digital bit values) that is established based on a premise, understanding, and intent that it is to remain unchanged, absent extenuating circumstances that require an alteration, for entirety of the subscription's effective duration. The sensitive information 103 may be a long-term identifier such as, but not limited to, an International Mobile Subscriber Identity (IMSI) and/or one or more of the values that make up the IMSI, such as the mobile subscription identification number (MSIN), mobile network code (MNC), and/or mobile country code (MCC). An exemplary scenario wherein the MNC and MCC can be seen as the sensitive information is the case where the UE, e.g. through a SIM therein, has an agreement with the HPLMN that the UE by default first uses a decoy MNC and/or MCC and first after determined proof-of-presence the HPLMN reveals the real MNC and/or MCC to the VPLMN. Alternatively or additionally, the sensitive information 103 may comprise long-term identifier such as an International Mobile Equipment Identity (IMEI), an Internet Protocol (IP) address such as a static IP address, or the like, or a shorter-term identifier, such as a Globally Unique Temporary Identity (GUTI), Cell Radio Network Temporary Identity (C-RNTI), a dynamically assigned (through DHCP) IP address or any similar known identifier that is kept private or can be made private or otherwise can be kept as a secret between a limited set of devices. It is to be noted that a dynamically assigned IP address may be considered as a long-term identifier in some scenarios and as a short-term identifier in other. A long-term identifier does not mean that it necessarily have to be a permanent identifier.

Returning to method 200, at block 202, the network node 108 obtains, from a VPLMN 112, a proof-of-presence indicator 101 that represents the UE 102 as being present in the VPLMN 112. The proof-of-presence 101 may make such a representation explicitly or implicitly. In other words, in the explicit case, the proof-of-presence 101 may include identification information corresponding to a particular VPLMN that is serving the UE 102 at the time the UE 102 generates the proof-of-presence 101. Such identifying information may include a PLMN identity (Mobile Country Code (MCC) of the VPLMN, Mobile Network Code (MNC) of the VPLMN, tracking area code, Mobility Management Entity (MME) identity, cell identity, identifiers of neighboring cells, frequency utilized by the VPLMN, or any other identifying feature that can be used to identify the VPLMN. In other examples, the representation may be implicit, such that the HPLMN infers that the UE sought to identify its serving VPLMN to the HPLMN by routing the proof-of-presence 101 through the VPLMN such that it would be received by the HPLMN by its current VPLMN. In such cases, this implicit representation that the UE is present in the VPLMN may occur where the proof-of-presence 101 does not contain identification information specific to the VPLMN.

In an aspect, the proof-of-presence 101 is generated by the UE using a secret 110 (i.e., is privately-held by a limited, discrete set of networks and devices) that is shared between the UE 102 and at least the HPLMN 114. In some embodiments, the secret 110 includes one or more types of verification information to be included in any proof-of-presence communicated to the HPLMN 114 by the UE 102. For instance, a result H of a particular hash function on both a key value (or "key") K and a freshness value F (F=a dynamic integer value) is an example type of verification information that may be required in a proof-of-presence 101. The freshness value may comprise, or may otherwise be set or may depend on one or more of:

- a counter, where generating next freshness value is incrementing the counter, and the counter is known to UE and HPLMN (or the UE includes counter in proof-of-presence indicators 101 or other messages to the HPLMN, which would mean that there would not be any requirement on synchronizing the counter values)
- a timestamp or partial timestamp, where the timestamp is known to UE and HPLMN (or the UE includes counter in proof-of-presence indicators 101 or other messages)
- nonce, a nonce which is given by the HPLMN to the UE in some previous protected interaction, such as previous authentication run (or a nonce which is generated by the UE)
- Any other freshness value known in the art.

Other non-limiting types of verification information may be a digital signature of a device, such as the UE 102, a result of encryption or decryption of given data, or identification information of the VPLMN. Though in some examples there may be only one required type, some embodiments may require multiple types of required verification information. These one or more types of verification information may be established at a time before verification is required (e.g., at or around the time of establishment of HPLMN 114 as the home PLMN of the UE 102, such as execution of subscription agreement or the like). For purposes of the present disclosure, the term "verification information" (as opposed to "type" thereof) corresponds to particular values of the different "types" of verification information whose inclusion in the proof-of-presence 101 is mandated by the secret between the UE and the HPLMN. An example of digital signature usage in some embodiments is the use of a public key and a private key (asymmetric cryptography) of the UE. The UE uses its private key to sign a message to the HPLMN and the HPLMN, which has access to the public key, can then verify the message through the public key.

Likewise, the secret 110 may include information necessary to generate at least some of the verification information (i.e. values). In the above example, the necessary information may include the particular hash function hash($V_1$, $V_2$, ..., $V_N$) to be executed using verification information values $V_1, V_2, ..., V_N$. In some examples, the hash function may come in the form of a reverse hash chain (see FIG. 10). In some examples, a hash function may be provided with an initial (or static) seed value that is a necessary input parameter to obtain a correct verification information value. This can be a random number, subscriber IMSI, any other long-term identifier of the UE, or any other number or parameter value agreed upon. The necessary information may also include information regarding a freshness number associated with the hash function. The freshness value may be updated each time the hash function is executed, and as such, the information may include an initial freshness value (e.g., 0, 1, or any other number) and a step value by which the freshness value will be changed after hash function execution. In some examples, the verification information may include a result of encryption or decryption of a particular set of data. As such, an encryption or decryption key, pre-encryption/pre-decryption value, and encryption/decryption method may be included in the information necessary to generate at least some of the verification information. Though the above includes some examples of verification information types and the required information for generating associated verification information values, they are not limiting and any particular scheme, and this include any hash functions, encryption/decryption methods or standards, or other techniques known to provide verification of data between devices.

The proof-of-presence 101 can be sent from the UE to the VPLMN in a message that triggers an Authentication and Key Agreement (AKA) run such as Attach Request or Service Request and then the VPLMN can forward the proof-of presence to the HPLMN in Authentication Information Retrieval. Another example is at the end of AKA run when the UE sends the authentication response and the VPLMN can send the proof-of-presence in a location update to the HPLMN.

Furthermore, at block 204 of method 200, the network node 108 verifies whether or not the UE is present in the VPLMN by determining whether or not the proof-of-presence indicator was generated by the UE using the secret shared between the UE and at least the HPLMN. In an aspect, this may include obtaining local verification information using the secret and comparing verification information in the obtained proof-of-presence indicator to the local verification information. In other words, in an aspect, the HPLMN 114 can utilize the information necessary for generating verification information to generate its own, local version of the verification information generated by the UE 102 and sent in the proof-of-presence 101 obtained by the HPLMN 114. In some examples, the local verification information includes identification information associated with the VPLMN 112, which the HPLMN 114 may obtain from memory in the network node 108 or via a communication received from the VPLMN 112, a PLMN other than the VPLMN, an external Internet Protocol (IP) network, or a different network node of the HPLMN.

Once generated, this generated local verification information is compared to the received verification information in the proof-of-presence 101. Given that the HPLMN 114 and a trusted UE 102 possess the same information necessary to generate the verification information (i.e., the shared secret), if the local verification information matches the obtained verification information, the HPLMN 114 can determine that the UE 102 is present in the VPLMN 112 that forwarded the proof-of-presence 101 to the HPLMN 114. If such a positive determination is made, the HPLMN 114 can send sensitive information 103 to the VPLMN 112 such that operation 116 can be executed toward the UE 102. Alternatively, where the local verification information does not match the obtained verification information, the HPLMN 114 can determine that the UE 102 is not present in the VPLMN 112 that forwarded the proof-of-presence 101 to the HPLMN 114. In this case, the HPLMN 114 may forward a failure indication to the VPLMN 112 for forwarding to the UE 102 and may optionally drop the VPLMN 112 and/or UE 102 from a list of trusted networks, devices, subscribers, or users (and optionally report one or both of the VPLMN 112 and/or UE 102 as malicious).

Figure 3:
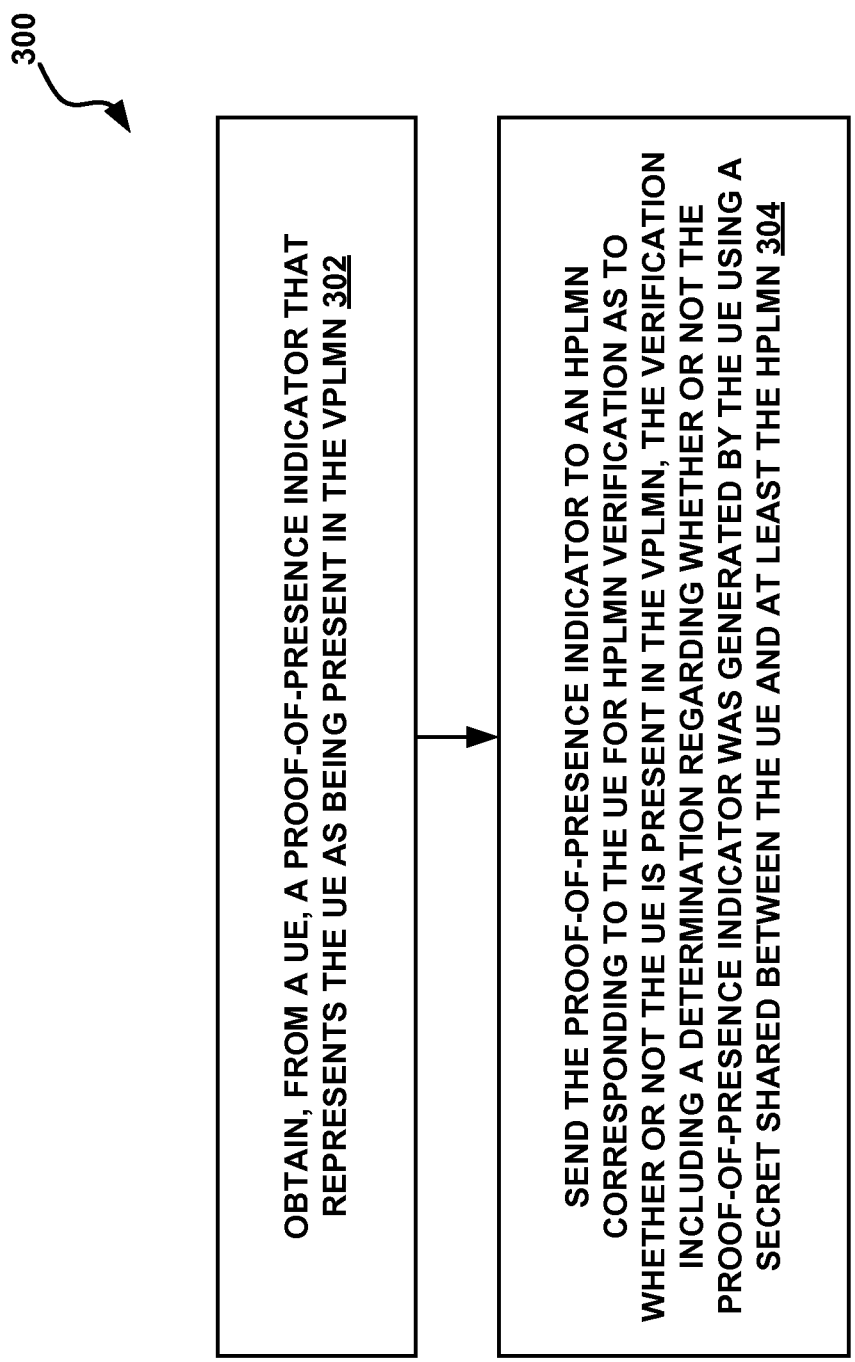
FIG. 3 illustrates a method performed by a network node of a home PLMN according to one or more embodiments.

FIG. 3 illustrates an example method 300 performed by the network node 106 of a VPLMN 112 for obtaining sensitive information 103 of the UE 102 that is served by the VPLMN 112. According to example method 300, at block 302, the network node 106 obtains, from a UE, a proof-of-presence indicator that represents the UE as being present in the VPLMN 112. In addition, at block 304 of method 300, the VPLMN 112/network node 106 can send the proof-of-presence indicator to a HPLMN corresponding to the UE for HPLMN verification as to whether or not the UE is present in the VPLMN. As described above, the HPLMN verification can include a determination regarding whether or not the proof-of-presence indicator was generated by the UE using a secret shared between the UE and at least the HPLMN.

Although not explicitly shown in FIG. 3, method 300 can optionally include further aspects, some of which have been introduced above in reference to the method 200 performed on the HPLMN 114 side. For instance, method 300 may include the VPLMN receiving sensitive information corresponding to the UE based on the HPLMN verifying that the UE is present in the VPLMN and performing an operation corresponding to the UE using the sensitive information. Although not all UE-related operations 116 performed by a network node 106 of a VPLMN 112 require that the sensitive information 103 be known, some operations (including some required by law) do require (or can optionally utilize) the sensitive information 103 before execution. For instance, the operation 116 may be an operation related to a lawful interception of the UE. In other examples, the operation 116 may be economic or marketing in nature, such as an operation for recognizing one or more UEs that have previously been served by a particular PLMN and providing one or more incentives for these UEs to connect to the VPLMN (or, if an optional reselection or handover is imminent, incentive to remain connected to the VPLMN). In still other examples, the operation may be related to certain UE-specific operational service parameters or guarantees, such as setting or modifying one or more Quality of Service parameters associated with a UE (or user/subscriber). The operation could alternatively be related to policy and/or charging control associated with the UE 102. Although these few examples provide a limited picture of some example operations, the feature of obtaining sensitive information 103 by a VPLMN or revealing the secret information by a home PLMN can be extended to any operation or process that may be applied at a single-UE granularity.

In further additional aspects of method 300, the network node 106 of the VPLMN may receive a failure message from the HPLMN based on the HPLMN verifying that the UE is not present in the VPLMN. Based on receiving this failure message, the network node 106 may send a failure indication to the UE 102 to inform the UE 102 that the verification was unsuccessful. In addition, in some embodiments, the network node 106 of the VPLMN 112 may send identification information associated with the VPLMN to the HPLMN, where the identification information is used by the HPLMN during the verification (e.g., for comparing against VPLMN identification information present in the proof-of-presence 101). Sending this identification information may be in response for a request for the identification information received from the HPLMN, for example.

Figure 4:
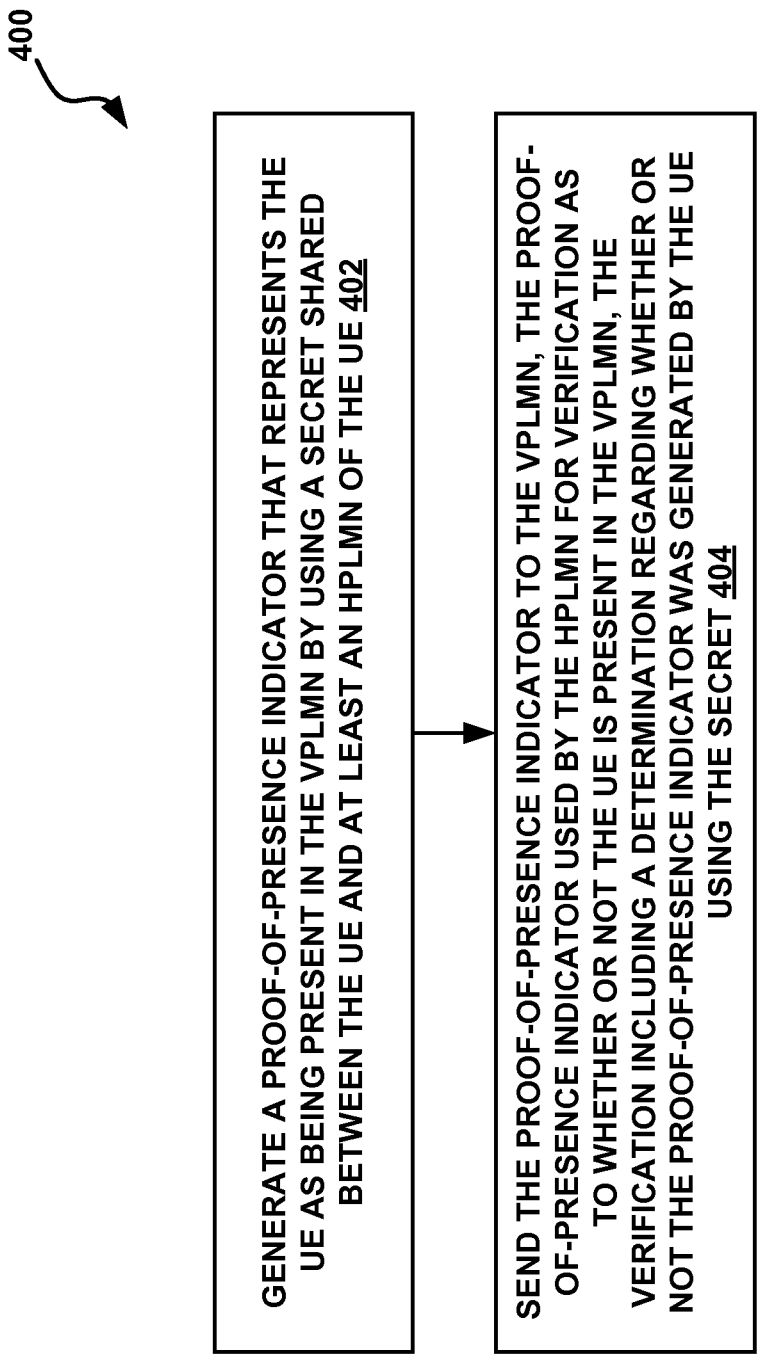
FIG. 4 illustrates a method performed by a network node of a home PLMN according to one or more embodiments.

FIG. 4 illustrates an example method 400 performed by the UE 102 served by the VPLMN 112 and having the HPLMN 114. According to example method 400, at block 402, the UE 102 generates a proof-of-presence indicator that represents the UE as being present in the VPLMN by using a secret shared between the UE and at least the HPLMN of the UE. The proof-of-presence 101 can include verification information generated based on the secret. In addition, method 400 includes, at block 404, the UE 102 can send the proof-of-presence indicator to VPLMN 112 for HPLMN verification as to whether or not the UE is present in the VPLMN. As described above, the HPLMN verification can include a determination regarding whether or not the proof-of-presence indicator was generated by the UE using a secret shared between the UE and at least the HPLMN. In some examples, the verification information included in the proof-of-presence 101 includes a freshness value (associated with a function used to generate the verification information, such as a hash function). In some examples, after the verification information is generated (e.g., based on the hash function) the UE 102 may update the freshness value based on a technique set as part of the shared secret. In some examples, the UE may update the freshness value only where a failure indication corresponding to the HPLMN verification is not received during a particular time duration after sending the proof-of-presence to the VPLMN. This time duration and/or a technique for obtaining the time duration (whether static or dynamic) may also be set out as a component of the shared secret.

FIGS. 5-10 present different example process and signal flows for different example embodiments for providing proof of presence of the UE 102 in the VPLMN 112 to the HPLMN 114 to ensure that sensitive information 103 of a UE 102 is securely revealed to a legitimate, current VPLMN 112 of the UE 102. The example embodiments illustrated in FIGS. 5-10 are by no means intended to be an exclusive set of all possible embodiments. Instead, these illustrated example embodiments represent a subset of possible embodiments that are contemplated by the present disclosure.

Figure 5:
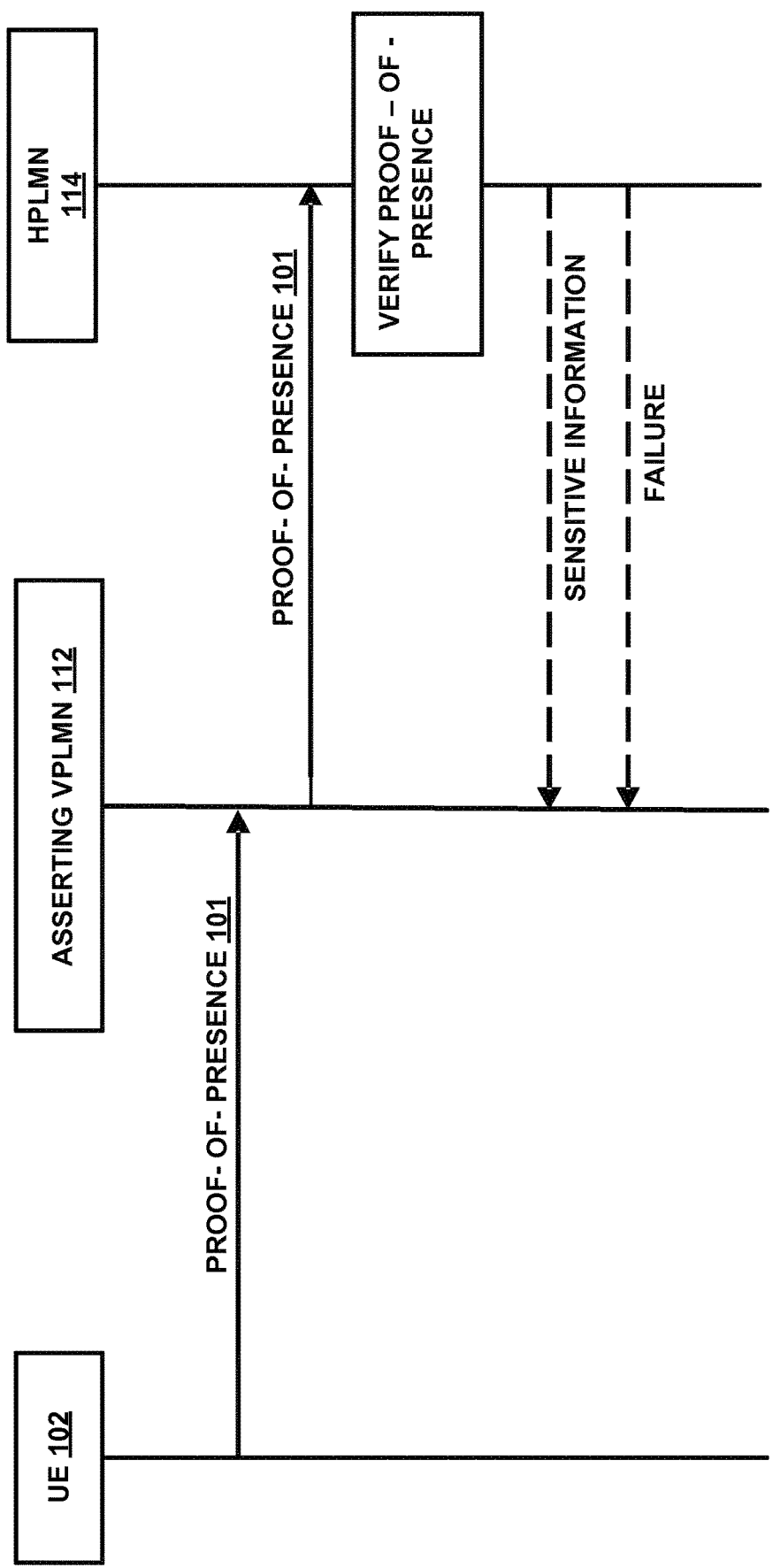
FIG. 5 illustrates a process and signal flow implemented in example embodiments of the invention.

Turning to these illustrated example embodiments, FIG. 5 illustrates an example general implementation for providing proof of presence of the UE 102 in the VPLMN 112 to the HPLMN 114. As shown, the UE 102 may generate and send a proof-of-presence 101 to a VPLMN 112 (also referred to herein as an asserting VPLMN 112, as it asserts, or represents, itself as the current VPLMN 112 by virtue of forwarding the proof-of-presence 101 to the HPLMN 114). The VPLMN 112 forwards the proof-of-presence 101 to the HPLMN 114. Once received, the HPLMN 114 performs verification of the received proof-of-presence 101, for instance, by comparing locally generated verification information to verification information included in the obtained proof-of-presence 101. Based on the comparison, HPLMN 114 determines either that the UE 102 generated the proof-of-presence 101 using the secret shared between the UE and the HPLMN 114 or did not, and therefore the HPLMN 114 either verifies that the UE 102 is present in the VPLMN 112 or is not present in the VPLMN 112, respectively. The respective results of these options are indicated by the dashed signal lines in FIG. 5 (as well as the rest of the figures, where present). Specifically, where the proof-of-presence 101 is verified (is successful, meaning that the comparison resulted in a match), the HPLMN 114 sends sensitive information to the asserting VPLMN 112. Alternatively, where the proof-of-presence 101 is not verified (is unsuccessful, meaning that the comparison did not result in a match), the HPLMN 114 sends a failure message to the asserting VPLMN 112.

Figure 6:
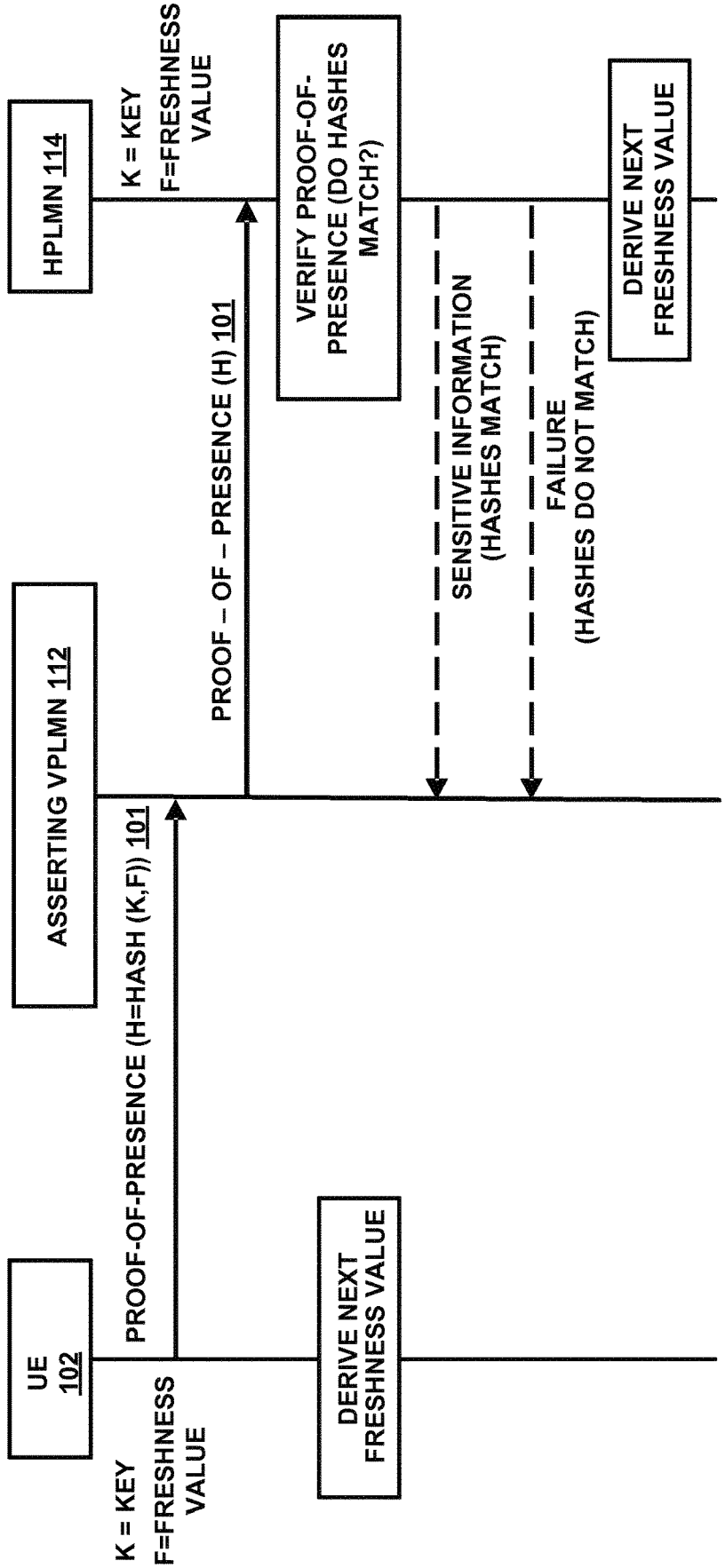
FIG. 6 illustrates a process and signal flow implemented in example embodiments of the invention.

FIG. 6 illustrates another example implementation expanding on the general example of FIG. 5 where the secret shared by the UE and the HPLMN contains a hash function that is utilized for generation and subsequent verification of the proof-of-presence 101. In this example, the secret includes not only the hash function itself, but also a particular key value and a freshness value that are used as inputs to (i.e. seed) the hash function. In an aspect, the freshness value $F_i$ is a numerical value that may be altered identically (according to the secret) each time the hash function is used to generate a hash value H. In other words, for an iteration i of hash function, the resulting value H=hash (K,$F_i$). Use of this hash function provides an implicit representation, when forwarded by the VPLMN to the HPLMN, that the UE 102 is present in the forwarding VPLMN. The HPLMN performs verification of the proof-of-presence 101 by determining whether there is a match between the verification information (the hash value H included in the proof-of-presence 101) and local verification information (a hash value $H_{LOCAL}$ generated at the HPLMN). Again, the HPLMN either sends sensitive information of a failure message to the VPLMN depending on whether the verification is successful or unsuccessful. Additionally, as shown in FIG. 6, the UE 102 and the HPLMN 114 derive a next freshness value F after executing the hash function.

Figure 7:
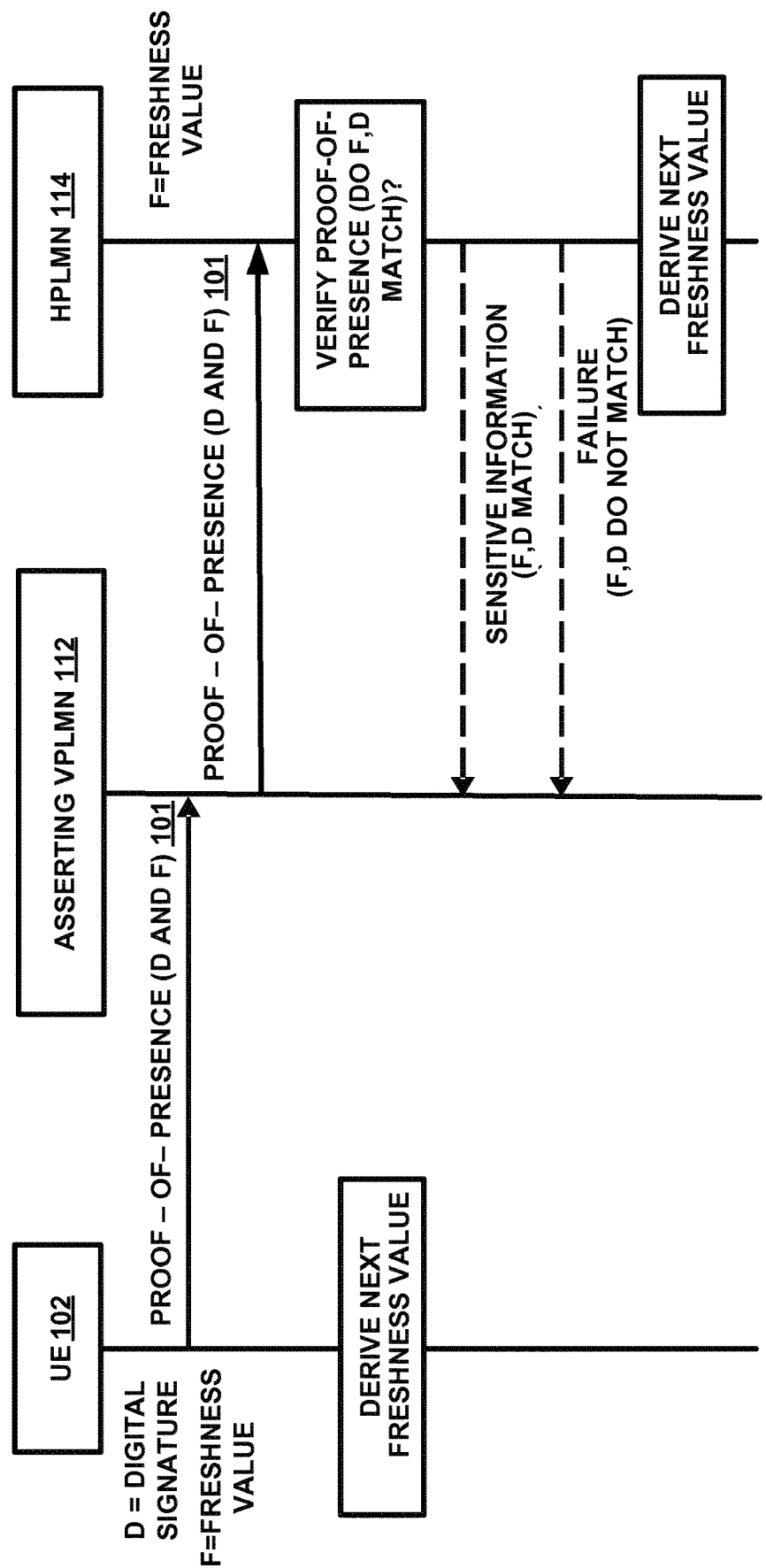
FIG. 7 illustrates a process and signal flow implemented in example embodiments of the invention.

FIG. 7 illustrates a further example whereby the shared secret includes information regarding how a freshness value is to be changed for each iteration of generating a proof-of-presence 101 at the UE 102 and verifying the proof-of-presence 101 at the HPLMN. Unlike the example of FIG. 6, however, the UE 102 of FIG. 7 utilizes a digital signature as a verification technique instead of a hash function. The HPLMN 114 uses the digital signature D and the freshness value F to perform verification, again sends the corresponding signal (sensitive information or failure message) to the VPLMN, and derives the next freshness value according to the secret. Where appropriate, the HPLMN 114 can use the public key of the UE 102 to verify the digital signature during verification.

Figure 8:
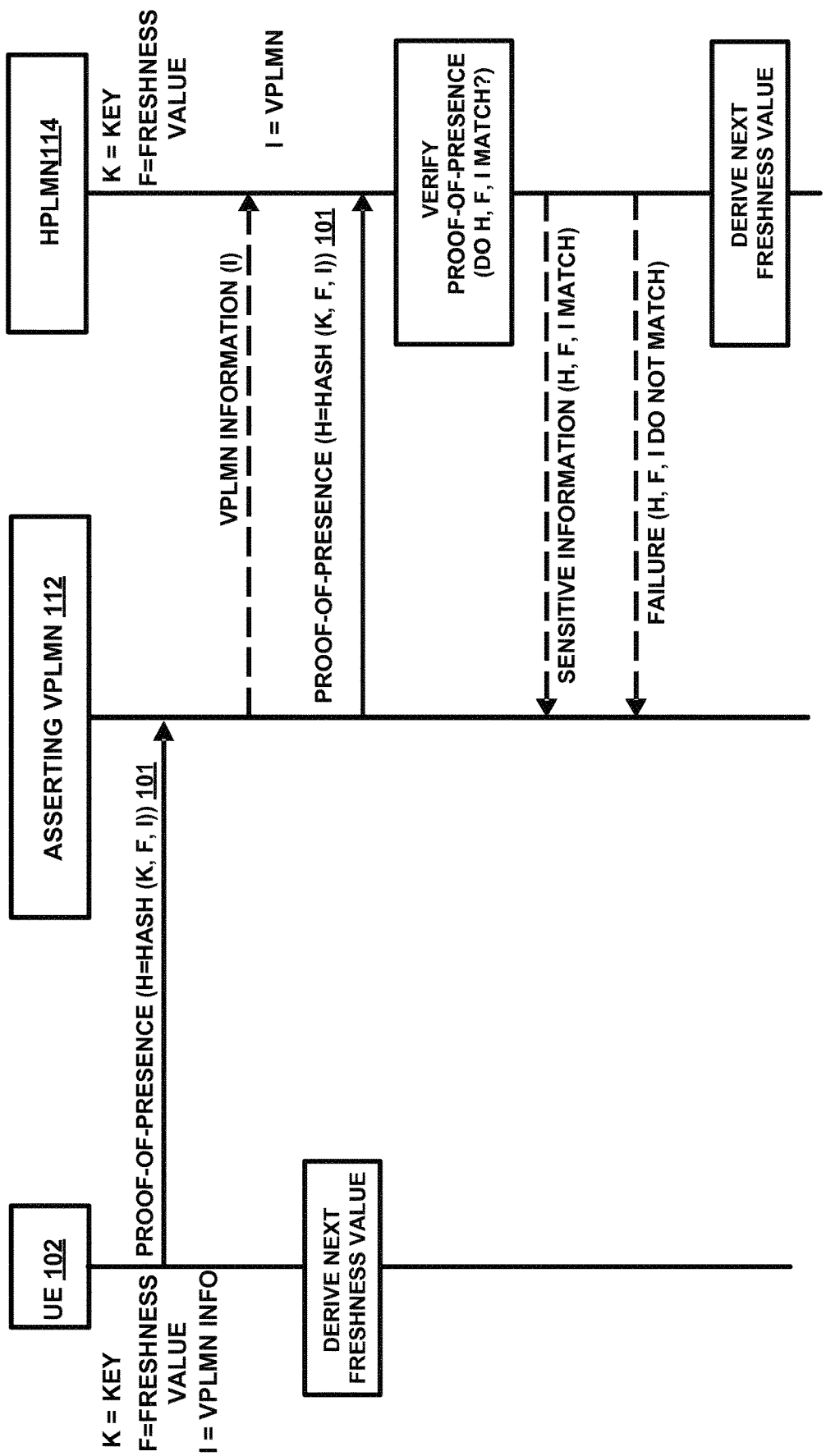
FIG. 8 illustrates a process and signal flow implemented in example embodiments of the invention.

FIG. 8 illustrates another example that is similar to the example presented in FIG. 6, except that identifying information (I) corresponding to the VPLMN 112 is utilized in the hash function as part of the secret. In the examples of FIGS. 6 and 7, the UE 102 implicitly provides a representation to the HPLMN that the UE is present in the VPLMN because the HPLMN receives the proof-of-presence 101 from the UE via the VPLMN. Nevertheless, in those previous examples, it is not guaranteed that the UE is present at this specific VPLMN, because the proof-of-presence is not explicitly bound to the VPLMN by unique identification information of the VPLMN. For instance, in a possible scenario, the VPLMN might be using some infrastructure to tunnel proof-of-presence indications to the HPLMN from a different, potentially malicious, location/VPLMN. By utilizing unique identification information of the VPLMN as an input parameter for the hash function, the example of FIG. 8 addresses this issue. In other words, because VPLMN identifying information (I) is used to calculate the hash function result H, the proof-of-presence indication from the UE is bound to the VPLMN. As a result, the HPLMN receives an explicit representation that the VPLMN that is communicating with the HPLMN is the VPLMN in which the UE is actually present. When generating the proof-of-presence 101 using the VPLMN identification information as input, the UE may obtain the VPLMN information from broadcast messages of the VPLMN (e.g. system information blocks (SIB) messages or via access spectrum (AS) or non-access spectrum (NAS) signaling from the VPLMN network node (e.g., MME or eNB). Likewise, the HPLMN can obtain the VPLMN information for verifying the proof-of-presence from a local database or may infer it from the interface to the VPLMN (e.g., receive the information in a message from the VPLMN or another HPLMN network node).

Figure 9:
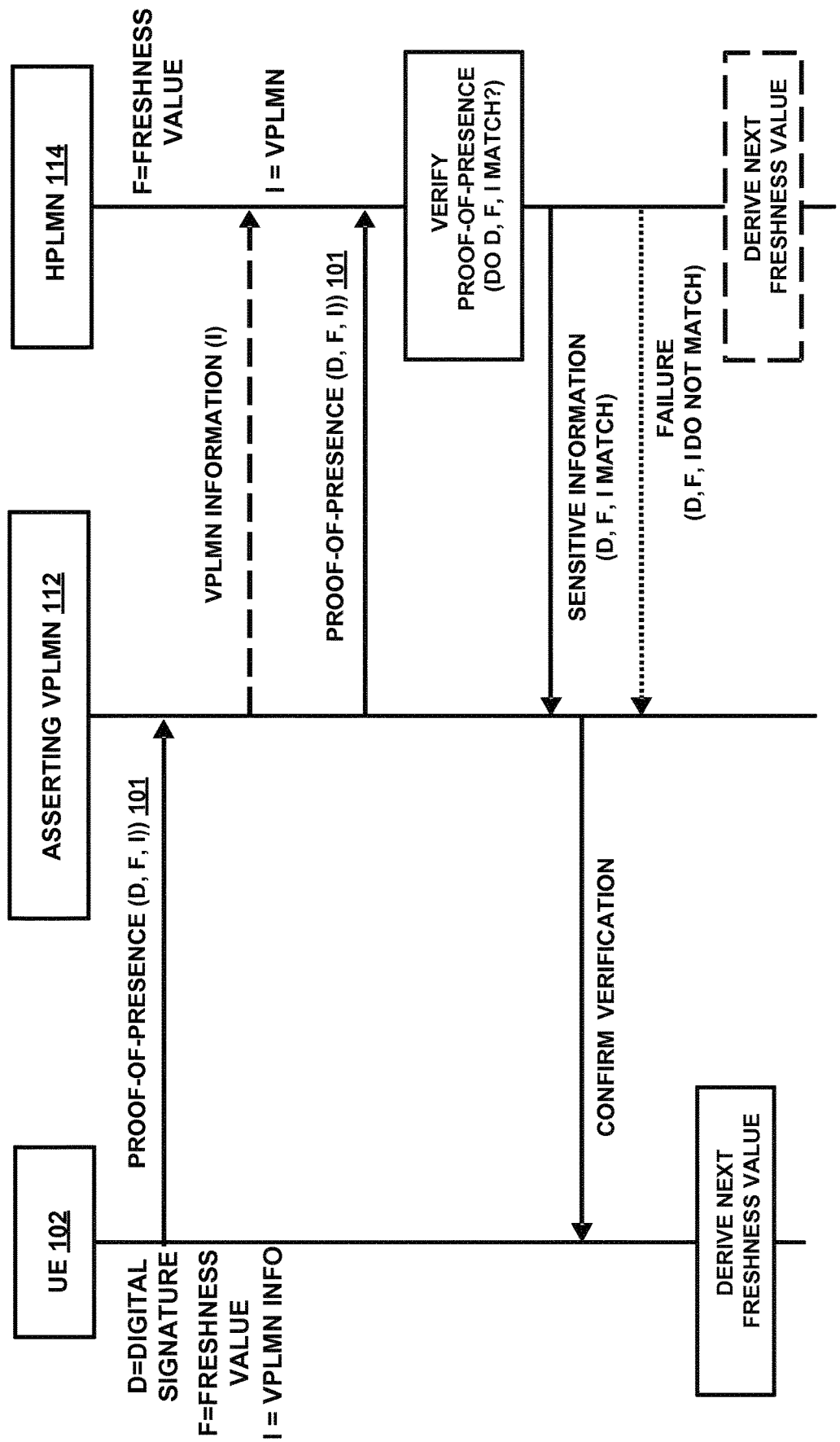
FIG. 9 illustrates a process and signal flow implemented in example embodiments of the invention.
Figure 10:
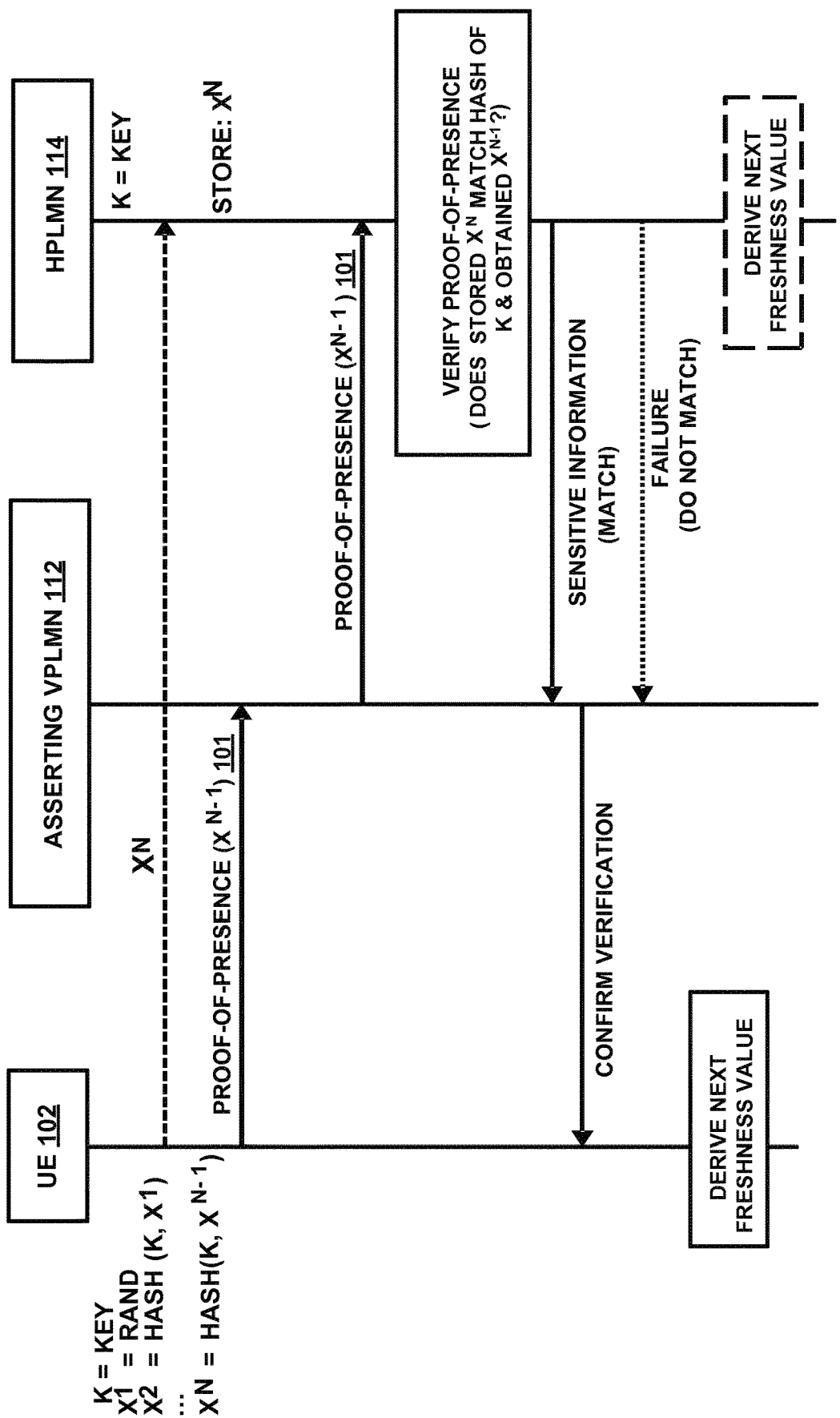
FIG. 10 illustrates a process and signal flow implemented in example embodiments of the invention.

FIG. 9 presents an additional example implementation to that of FIG. 8, wherein instead of using a hash function specified as a part of the secret shared by the UE 102 and HPLMN 114, a digital signature, freshness value, and VPLMN identifying information can be separately required as verification information included in the proof-of-presence 101 generated at the UE and verified at the HPLMN. Where appropriate, the HPLMN can use the public key of the UE 102 to verify the digital signature during verification. FIG. 10 illustrates a further example embodiment, wherein the proof-of-presence indicator 101 again contains a hash, but unlike the previous examples, verification of the proof-of-presence is performed using a reverse hash chain. This hash chain constitutes at least a portion of the secret (i.e., as instructions regarding how to generate the verification information values) that is shared between UE 102 and the HPLMN. As can be seen in FIG. 10, a starting value, called $X^N$ in FIG. 10, can be pre-shared (e.g., optionally as part of the shared secret and/or before a proof-of-presence indicator 101 is generated/verified) between the UE and the HPLMN (similar to an initial freshness value according to other examples above) or could be sent to the HPLMN by the UE in one or more earlier, possibly protected (e.g., encrypted), messages. This $X^N$ starting value has been obtained by the UE by calculating a hash chain $X^1$=rand, $X^2$=hash($X^1$, K), . . . , $X^N$=hash ($X^{N-1}$, K), where K is a key shared between the UE and the HPLMN and rand is a random number. The UE represents its presence to the HPLMN by sending the value $X^{N-1}$ to the HPLMN, and the HPLMN verifies the presence of the UE by checking whether $X^N$=hash ($X^{N-1}$, K).

Figure 11:
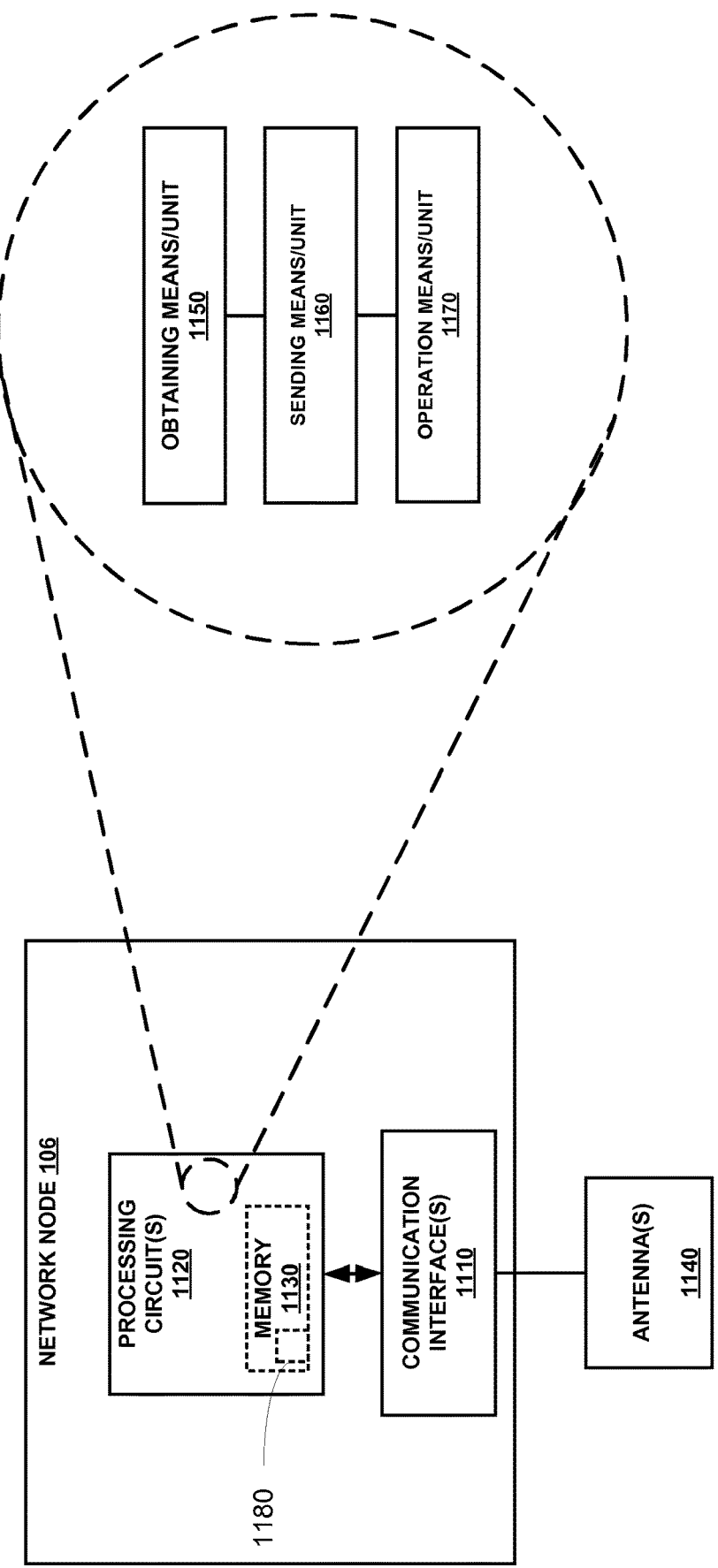
FIG. 11 illustrates aspects of an example network node of an VPLMN in example embodiments of the invention.

FIG. 11 illustrates additional details of the network node 106 of a VPLMN 112 according to one or more embodiments. The network node 106 is configured, e.g., via functional means or units (also may be referred to as modules or components herein), to implement processing to perform certain aspects described above in reference to at least FIGS. 1, 3, and 5-10. The network node 106 in some embodiments for example includes an obtaining means or unit 1150 for obtaining a proof-of-presence indicator from a UE, a sending means or unit 1160 for sending the proof-of-presence indicator to an HPLMN, and an operation means or unit 1170 for performing one or more operations requiring the sensitive information of a particular UE. These and potentially other functional means or units (not shown) together perform the aspects of method 300 presented in FIG. 3 and/or features described in FIGS. 5-10 as being related to the VPLMN 112 and/or network node 106.

In at least some embodiments, the network node 106 comprises one or more processing circuits 1120 configured to implement processing of the method 200 of FIG. 2 and certain associated processing of the features described in relation to FIGS. 5-10, such as by implementing functional means or units above. In one embodiment, for example, the processing circuit(s) 1120 implements functional means or units as respective circuits. The functional units may thus be implemented with pure hardware, like ASICs or FPGAs. In another embodiment, the circuits in this regard may comprise circuits dedicated to performing certain functional processing and/or one or more microprocessors in conjunction with a computer program product/computer readable storage medium in the form of a memory 1130. In embodiments that employ memory 1130, which may comprise one or several types of memory such as read-only memory (ROM), random-access memory, cache memory, flash memory devices, optical storage devices, etc., the memory 1130 stores program code that, when executed by the one or more microprocessors carries out the techniques described herein.

In one or more embodiments, the network node 106 also comprises one or more communication interfaces 1110. The one or more communication interfaces 1110 include various components (e.g., antennas 1140) for sending and receiving data and control signals. More particularly, the interface(s) 1110 include a transmitter that is configured to use known signal processing techniques, typically according to one or more standards, and is configured to condition a signal for transmission (e.g., over the air via one or more antennas 1140). Similarly, the interface(s) include a receiver that is configured to convert signals received (e.g., via the antenna(s) 1140) into digital samples for processing by the one or more processing circuits. In an aspect, the obtaining module or unit 1150 may comprise or may be in communication with the transmitter and/or receiver. The transmitter and/or receiver may also include one or more antennas 1140.

Figure 12:
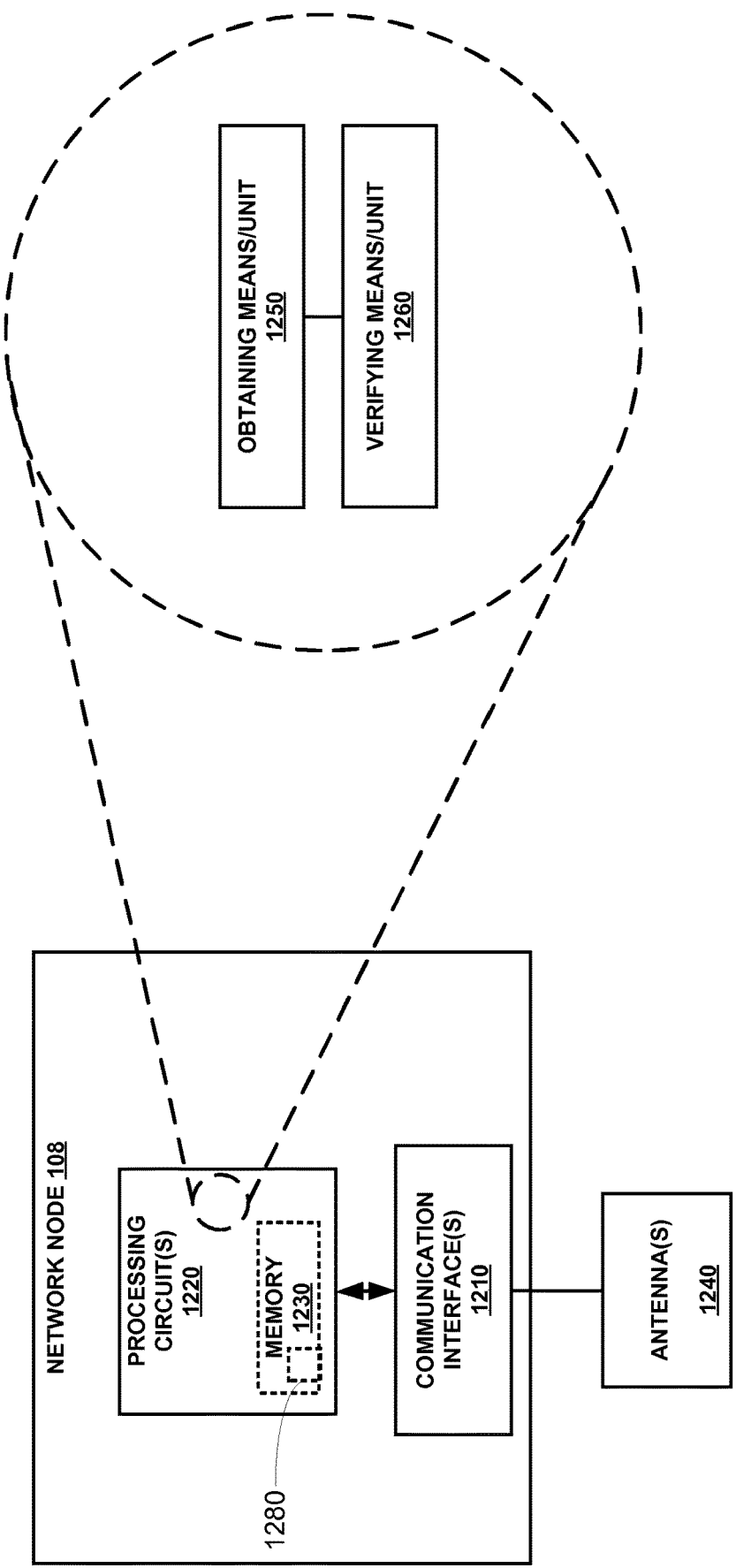
FIG. 12 illustrates aspects of an example network node of a HPLMN in example embodiments of the invention.

FIG. 12 illustrates additional details of an example network node 108 of a HPLMN 114 according to one or more embodiments. The network node 108 is configured, e.g., via functional means or units (also may be referred to as modules or components herein), to implement processing to perform certain aspects described above in reference to FIGS. 2 and 5-10. The network node 108 in some embodiments for example includes an obtaining means or unit 1250 for obtaining a proof-of-presence 101 from a VPLMN, and a verifying means or unit 1260 for verifying whether or not the UE is present in the VPLMN and comparing verification information of the proof-of-presence 101 to locally generated verification information. These and potentially other functional means or units (not shown) together perform the aspects of method 300 presented in FIG. 3 and/or features described in FIGS. 5-10 as being related to the HPLMN 114 and/or network node 108.

In at least some embodiments, the network node 108 comprises one or more processing circuits 1220 configured to implement processing of the method 200 of FIG. 2 and certain associated processing of the features described in relation HPLMN 114 and/or network node 108 to FIGS. 5-10, such as by implementing functional means or units above. In one embodiment, for example, the processing circuit(s) 1220 implements functional means or units as respective circuits. The functional units may thus be implemented with pure hardware, like ASICs or FPGAs. In another embodiment, he circuits in this regard may comprise circuits dedicated to performing certain functional processing and/or one or more microprocessors in conjunction with a computer program product/computer readable storage medium in the form of a memory 1230. In embodiments that employ memory 1230, which may comprise one or several types of memory such as read-only memory (ROM), random-access memory, cache memory, flash memory devices, optical storage devices, etc., the memory 1230 stores program code that, when executed by the one or more microprocessors, carries out the techniques described herein.

In one or more embodiments, the network node 108 also comprises one or more communication interfaces 1210. The one or more communication interfaces 1210 include various components (e.g., antennas 1240) for sending and receiving data and control signals. More particularly, the interface(s) 1210 include a transmitter that is configured to use known signal processing techniques, typically according to one or more standards, and is configured to condition a signal for transmission (e.g., over the air via one or more antennas 1240). In an aspect, the revealing module or unit 1260 may comprise or may be in communication with the transmitter. Similarly, the interface(s) include a receiver that is configured to convert signals received (e.g., via the antenna(s) 1240) into digital samples for processing by the one or more processing circuits. The transmitter and/or receiver may also include one or more antennas 1240.

Figure 13:
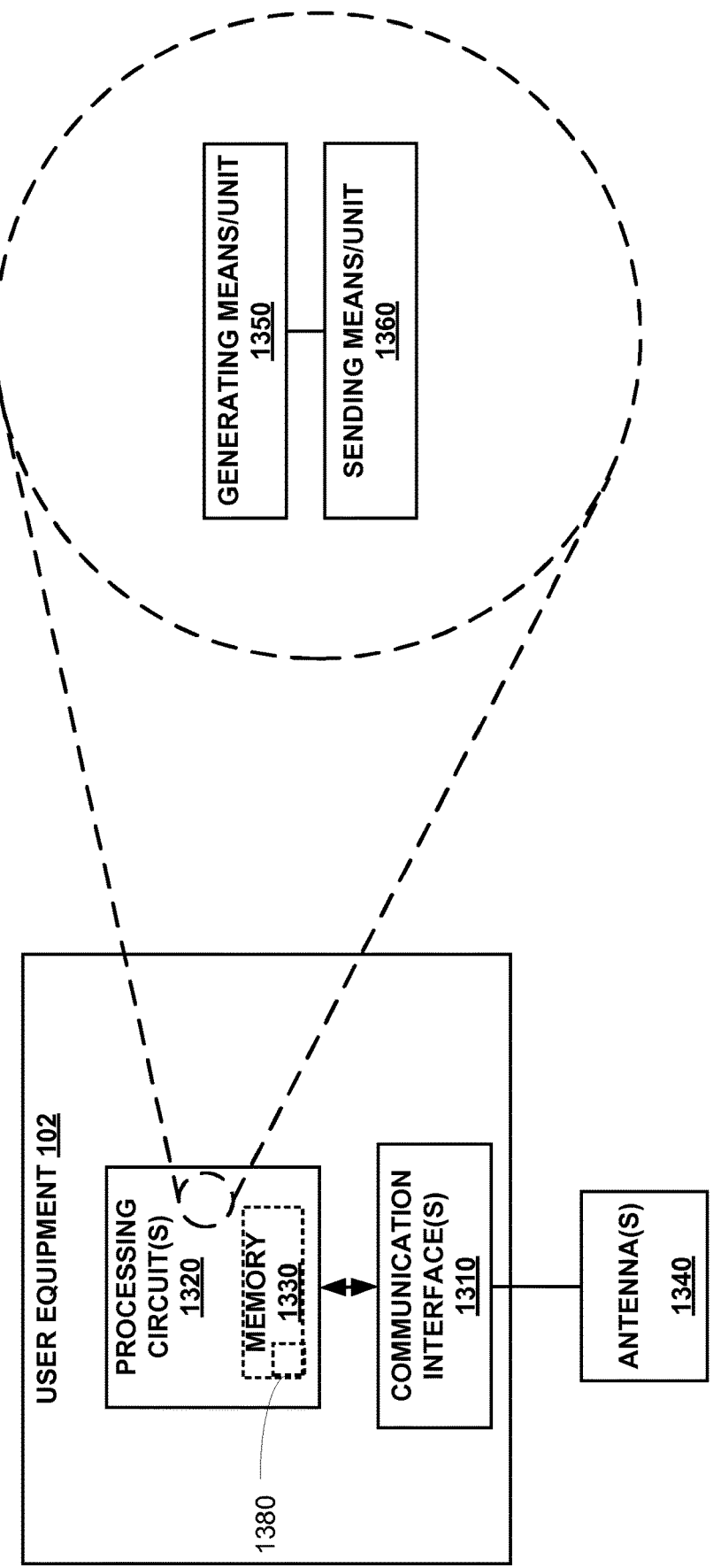
FIG. 13 illustrates aspects of an example user equipment in example embodiments of the invention.

FIG. 13 illustrates additional details of an example UE 102 according to one or more embodiments. The UE 102 is configured, e.g., via functional means or units (also may be referred to as modules or components herein), to implement processing to perform certain aspects described above in reference to FIGS. 4-10. The UE 102 in some embodiments for example includes a generating means or unit 1350 for generating a proof-of-presence 101 according to a shared secret between the UE and its HPLMN and a sending means or unit 1360 for sending the proof-of-presence 101 to a VPLMN. These and potentially other functional means or units (not shown) together perform the aspects of method 300 presented in FIG. 3 and/or features described in FIGS. 4-6 as being related to the HPLMN 114 and/or UE 102.

In at least some embodiments, the UE 102 comprises one or more processing circuits 1320 configured to implement processing of the method 200 of FIG. 3 and certain associated processing of the features described in relation HPLMN 114 and/or UE 102 to FIGS. 4-6, such as by implementing functional means or units above. In one embodiment, for example, the processing circuit(s) 1320 implements functional means or units as respective circuits. The functional units may thus be implemented with pure hardware, like ASICs or FPGAs. In another embodiment, the circuits in this regard may comprise circuits dedicated to performing certain functional processing and/or one or more microprocessors in conjunction with a computer program product/computer readable storage medium in the form of a memory 1330. In embodiments that employ memory 1330, which may comprise one or several types of memory such as read-only memory (ROM), random-access memory, cache memory, flash memory devices, optical storage devices, etc., the memory 1330 stores program code that, when executed by the one or more microprocessors, carries out the techniques described herein.

In one or more embodiments, the UE 102 also comprises one or more communication interfaces 1310. The one or more communication interfaces 1310 include various components (e.g., antennas 1340) for sending and receiving data and control signals. More particularly, the interface(s) 1310 include a transmitter that is configured to use known signal processing techniques, typically according to one or more standards, and is configured to condition a signal for transmission (e.g., over the air via one or more antennas 1340). In an aspect, the revealing module or unit 1360 may comprise or may be in communication with the transmitter. Similarly, the interface(s) include a receiver that is configured to convert signals received (e.g., via the antenna(s) 1340) into digital samples for processing by the one or more processing circuits. The transmitter and/or receiver may also include one or more antennas 1340.

Those skilled in the art will also appreciate that embodiments herein further include corresponding computer programs illustrated as computer program 1180 in FIG. 11, computer program 1280 in FIG. 12 and computer program 1380 in FIG. 13. A computer program comprises instructions which, when executed on at least one processor of the network node 106, network node 108, or UE 102 cause these devices to carry out any of the respective processing described above. Furthermore, the processing or functionality of network node 106 or network node 108 may be considered as being performed by a single instance or device or may be divided across a plurality of instances of network node 106 or network node 108 that may be present in a given PLMN such that together the device instances perform all disclosed functionality. In addition, network nodes 106 and/or 108 may be any known type of device associated with a PLMN that is known to perform a given disclosed process or function. Examples of such network nodes include eNBs, Mobility Management Entities (MMEs), gateways, servers, and the like. For example, the network node 106 may be a node/device/a group of devices that form a node which resides in a core network part or an access network part of the VPLMN. In addition, although the VPLMN and the HPLMN are illustrated in the Figures and described above as being two separate PLMNs, this assumes that the UE is roaming outside of the HPLMN to a VPLMN for service. However, the aspects described above can also be applied to the case where the UE is not roaming (i.e., where the HPLMN provides service). In such a case, the HPLMN performs the dual-role of the HPLMN and the VPLMN entities. The above aspects can be implemented in this non-roaming scenario, as well.

Embodiments further include a carrier containing such a computer program. This carrier may comprise one of an electronic signal, optical signal, radio signal, or computer readable storage medium. A computer program in this regard may comprise one or more code modules corresponding to the means or units described above.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The advantages and effects of at least some of the above described embodiments may in addition to what is mentioned in the Background section of this application also be appreciated in view of the following.

In 2G, 3G, and 4G mobile network systems, an authentication and key agreement (AKA) is initiated by sending a subscriber's long-term identifier (e.g. IMSI) from the UE to the HPLMN (e.g. Home Subscriber Server (HSS) in 4G/EPC). The long-term identifier is typically stored in a Universal Integrated Circuit Card (UICC) and the UICC is placed in a UE. In a roaming case, the long-term identifier is sent to the HPLMN via a serving PLMN or VPLMN. Based on the long-term identifier, the HPLMN creates fresh authentication vector(s) (AV(s)) which include all authentication information needed to authenticate the subscriber, and the session key material to protect all subsequent communication with the UE. The 4G model is efficient in several ways, e.g. the HPLMN does not need to be involved in the actual authentication, and the actual authentication messages need not to be routed via the HPLMN. The protocols used to request subscriber related authentication information from the HPLMN are many, e.g. RADIUS, Diameter, and SS7. The HPLMN needs to respond to all signaling messages which request such information from any roaming partner.

In the above prior art mobile network systems, actively or passively acquiring long-term identifiers (e.g. IMSI) has been one of the most important attack strategies in compromising the subscriber privacy (e.g. subscriber location). Therefore, concealing long-term identifiers is an important issue for achieving subscriber privacy in the upcoming 5G system. Examples include using pseudonyms instead of long-term identifiers, using encrypted long-term identifiers, and a combination of both.

The 3GPP systems provide mechanisms for transferring subscriber related data between authorized entities, e.g. to retrieve necessary information for authenticating a subscriber and to update location about the entity currently serving a subscriber. For example, in the current Long Term Evolution (LTE) and 3G systems, a procedure called Authentication Information Retrieval is used by the MME and the Serving GPRS support node (SGSN) to request Authentication Vectors from the HSS. The MME sends an Authentication-Information-Request message (which contains an IMSI of a subscriber and a visited PLMN identifier) to the HSS. The HSS sends Authentication Vectors in the Authentication-Information-Answer only if valid subscription data exists for said IMSI and if the requesting entity is allowed to request authentication information for use in the VPLMN.

As another example, a procedure called Update Location is used by the MME and the SGSN to inform the HSS that this MME or SGSN is currently serving the user. The interface used for the transfer of subscriber related data between the HSS and the MME is called the 'S6a' interface, and the similar interface between the HSS and the SGSN is called the 'S6d' interface. The messages over the S6a and the S6d interfaces are based on the Diameter protocol and are transported over Internet Protocol/Stream Control Transmission Protocol (IP/SCTP). The S6a and the S6d interfaces may be protected using IPsec.

In the existing trust model of interconnect networks, a HPLMN always trusts another PLMN that a subscriber is present when the other PLMN runs procedures for transfer of subscriber related data (such as retrieving authentication information or location update).

A first problem with this is that the HPLMN has no way of checking whether the subscriber actually is present "at all" or not (i.e. anywhere). A second problem is that the HPLMN has no way of checking whether the subscriber is actually present at the "specific VPLMN" which is running procedures for transfer of subscriber related data.

The HPLMN needs to respond to all signaling messages requesting subscriber information from any roaming partner. Therefore, a mischievous or compromised PLMN entity, even when a subscriber is not actually present, can utilize procedures of transferring subscriber related data for unintended purposes (e.g. tracking a subscriber's location, eavesdropping a subscriber's communication, and/or false charging).

There are two different PLMNs involved when a UE roams: a serving or VPLMN where the UE is attached, and an HPLMN to which the UE's subscription belongs. It is the VPLMN that authenticates the UE, but it cannot retrieve the necessary authentication information and keying materials without the HPLMN. Therefore the VPLMN uses the above-mentioned mechanisms for transferring of subscriber data to get the required information from the HPLMN using interconnect networks. Note that when the UE is not roaming, the HPLMN performs the role of both the VPLMN and the HPLMN entities. The description of roaming is given for easy understanding. The claims should be general and covers roaming and non-roaming cases.

As mentioned above, during an Authentication Information Retrieval procedure, the only checks currently performed by the HPLMN (HSS in 4G) are:
whether a valid subscription data exists, and
whether the requesting VPLMN (visited MME in 4G) is allowed to make the request.

As such, there is no existing mechanism in the prior art which ensures the HPLMN that the subscriber, whose authentication information is being requested, is actually present in the VPLMN. Similarly, during an Update Location procedure, there is no mechanism which ensures the HPLMN that the subscriber, whose serving entity (visited MME or SGSN) is being updated, is actually present in the VPLMN. Therefore, a mischievous or compromised entity in the VPLMN may obtain the IMSI of a subscriber (e.g. using IMSI catchers or social engineering), and run procedures of transferring subscriber related data for un-intended purposes, for example:
tracking a subscriber's location;
eavesdropping a subscriber's communication; and/or
false charging.

Note that the problem of the HPLMN not knowing if the subscriber is at another PLMN exists even when pseudonyms or encrypted long-term identifiers are used instead of clear-text long-term identifiers (e.g. IMSI).

According to embodiments of the invention, the UE sends a proof-of-presence that the HPLMN is able to verify. The proof-of-presence could be used, e.g., before revealing the UE permanent identifier, location or an encryption key to the VPLMN, or before providing security related information needed to authenticate the UE to the visited PLMN. The use of proof-of-presence guarantees that PLMN's cannot use procedures for transfer of subscriber related data (e.g. authentication information retrieval, update location) for a subscriber that is not actually present. This allows more flexible trust and roaming models as the HPLMN might be connected to also less-trusted VPLMNs. Further, when the proof-of-presence is bound to the VPLMN information, then this guarantees to the HPLMN that the UE is not only present anywhere, but specifically present in the PLMN that is communicating with the HPLMN. According to various embodiments described above, the proof-of-presence may have the following properties:
protected from replay attacks (for example, using a counter or a time-stamp);
specific to the UE (for example, hashed or encrypted based on the shared secret between the UE and the HPLMN); and
calculated in a way such that the VPLMN cannot construct the proof-of-presence itself (for example, calculated based on the shared secret between the UE and the HPLMN).

The invention claimed is:

1. A method performed by a network node in a home public land mobile network, HPLMN, of a user equipment, UE, comprising:
obtaining, from a visited public land mobile network, VPLMN, a proof-of-presence indicator that represents the UE as being present in the VPLMN, the proof-of-presence indicator generated by the UE, by using a secret shared between the UE and at least the HPLMN;
verifying whether or not the UE is present in the VPLMN by determining whether or not the proof-of-presence indicator was generated by the UE using the shared secret; and
wherein generating the proof-of-presence indicator, at the UE, comprises generating verification information, wherein the verification information comprises a freshness value, and wherein the freshness value is updated only where a failure indication corresponding to an HPLMN verification is not received, by the UE, during a particular time duration after obtaining the proof-of-presence indicator from the VPLMN.

2. The method of claim 1, wherein verifying whether or not the UE is present in the VPLMN comprises:
obtaining local verification information, wherein at least some of the local verification information is obtained using the secret; and
comparing the verification information in the proof-of-presence indicator to the local verification information.

3. The method of claim 2, wherein verifying whether or not the UE is present in the VPLMN comprises determining that the UE is present in the VPLMN where the verification information in the proof-of-presence indicator matches the local verification information.

4. The method of claim 2, wherein verifying whether or not the UE is present in the VPLMN comprises determining that the UE is not present in the VPLMN where the verification information in the proof-of-presence indicator does not match the local verification information.

5. The method of claim 2, wherein the local verification information comprises a freshness value, the method further comprising updating the freshness value of the local verification information based upon verifying whether or not the UE is present in the VPLMN.

6. The method of claim 2, wherein the local verification information comprises identification information associated with the VPLMN, the method further comprising obtaining the identification information from memory in the network node or via a communication received from the VPLMN, a PLMN other than the VPLMN, an external Internet Protocol (IP) network, or a different network node of the HPLMN.

7. The method of claim 1, further comprising sending sensitive information to the VPLMN based on verifying that the UE is present in the VPLMN.

8. The method of claim 1, further comprising sending a failure message to the VPLMN based on verifying that the UE is not present in the VPLMN.

9. A method performed by a user equipment, UE, present in a visited public land mobile network, VPLMN, comprising:
generating a proof-of-presence indicator that represents the UE as being present in the VPLMN by using a secret shared between the UE and at least a home public land mobile network, HPLMN, of the UE;
sending the proof-of-presence indicator to the VPLMN, the proof-of-presence indicator used by the HPLMN for verification as to whether or not the UE is present in the VPLMN, the verification including a determination regarding whether or not the proof-of-presence indicator was generated by the UE using the secret; and
wherein generating the proof-of-presence indicator comprises generating verification information, wherein the verification information comprises a freshness value, and wherein the freshness value is updated only where a failure indication corresponding to an HPLMN verification is not received during a particular time duration after sending the proof-of-presence indicator to the VPLMN.

10. The method of claim 9, wherein at least some of the verification information is generated based on the secret.

11. The method of claim 9, wherein the secret comprises one or more types of verification information to be included in the proof-of-presence indicator and/or information necessary to generate at least some of the verification information.

12. The method of claim 11, wherein the verification information comprises one or more hash values, a freshness value, a digital signature of the UE, and/or identification information of the VPLMN.

13. The method of claim 11, wherein the information necessary to generate at least some of the verification information comprises one or more of a hash function, an initial freshness value, a freshness value increment size, an encryption or decryption key, and/or a hash seed value.

14. A network node of a home public land mobile network, HPLMN, of a user equipment, UE, the network node comprising:
  a processor and a memory, the memory containing instructions executable by the processor whereby the network node is configured to:
    obtain, from a visited public land mobile network, VPLMN, a proof-of-presence indicator that represents the UE as being present in the VPLMN, the proof-of-presence indicator generated by the UE, by using a secret shared between the UE and at least the HPLMN;
    verify whether or not the UE is present in the VPLMN by determining whether or not the proof-of-presence indicator was generated by the UE using the shared secret; and
    wherein generating the proof-of-presence indicator, at the UE, comprises generating verification information, wherein the verification information comprises a freshness value, and wherein the freshness value is updated only where a failure indication corresponding to an HPLMN verification is not received, by the UE, during a particular time duration after obtaining the proof-of-presence indicator from the VPLMN.

15. A user equipment, UE, present in a visited public land mobile network, VPLMN, the UE comprising:
  a processor and a memory, the memory containing instructions executable by the processor whereby the network node is configured to:
    generate a proof-of-presence indicator that represents the UE as being present in the VPLMN by using a secret shared between the UE and at least a home public land mobile network, HPLMN, of the UE;
    send the proof-of-presence indicator to the VPLMN, the proof-of-presence indicator used by the HPLMN for verification as to whether or not the UE is present in the VPLMN, the verification including a determination regarding whether or not the proof-of-presence indicator was generated by the UE using the secret; and
    wherein generating the proof-of-presence indicator comprises generating verification information, wherein the verification information comprises a freshness value, and wherein the freshness value is updated only where a failure indication corresponding to an HPLMN verification is not received during a particular time duration after sending the proof-of-presence indicator to the VPLMN.

* * * * *